United States Patent
Jokschas et al.

(10) Patent No.: US 6,852,217 B2
(45) Date of Patent: Feb. 8, 2005

(54) FILTER WITH AN ANNULARLY CONSTRUCTED FILTER MEDIUM

(75) Inventors: Guenter Jokschas, Murrhardt (DE); Helmut Luka, Marbach (DE); Jochen Reyinger, Stuttgart (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 1 day.

(21) Appl. No.: 09/881,043

(22) Filed: Jun. 15, 2001

(65) Prior Publication Data

US 2002/0038780 A1 Apr. 4, 2002

(30) Foreign Application Priority Data

Jun. 15, 2000 (DE) .......................... 100 29 539

(51) Int. Cl.[7] .......................... B01D 27/06; B01D 35/00
(52) U.S. Cl. .................... 210/86; 210/416.4; 210/493.2
(58) Field of Search .................. 210/114, 493.1–493.2, 210/493.5, 497.01, 85–86, 440, 442, 443–444, 97, 104, 111, DIG. 6, DIG. 13, DIG. 17, 416.1, 416.4, 416.5, 433, 435, 459–460, 462, 260, 262, 266, 282, 281, 233; 55/521, 497

(56) References Cited

U.S. PATENT DOCUMENTS

| | | | | |
|---|---|---|---|---|
| 2,049,530 A | * | 8/1936 | Van Eweyk | 210/153 |
| 2,103,434 A | * | 12/1937 | Pennebaker | 210/182 |
| 2,306,984 A | * | 12/1942 | Tolman | 210/171 |
| 3,279,607 A | * | 10/1966 | Michaelson | 210/223 |
| 3,288,299 A | | 11/1966 | Paton et al. | |
| 3,749,247 A | * | 7/1973 | Rohde | 210/205 |
| 4,118,206 A | * | 10/1978 | Hagendoorn | 210/290 |
| 4,565,629 A | * | 1/1986 | Wilson et al. | 123/557 |
| 4,610,848 A | * | 9/1986 | Weber | 422/106 |
| 4,638,305 A | * | 1/1987 | Sutton | 340/620 |
| 4,710,295 A | * | 12/1987 | Zabel | 310/336 |
| 5,213,682 A | * | 5/1993 | Richardson | 210/86 |
| 5,234,601 A | * | 8/1993 | Janke et al. | 210/662 |
| 5,520,800 A | * | 5/1996 | Glebovsky et al. | 123/196 A |
| 5,547,565 A | | 8/1996 | Biere et al. | |
| 5,591,329 A | * | 1/1997 | Davidson | 210/193 |
| 5,593,584 A | * | 1/1997 | Nurse, Jr. | 210/346 |
| 5,900,140 A | * | 5/1999 | Nagai et al. | 210/85 |
| 5,900,148 A | * | 5/1999 | Izutani et al. | 210/416.4 |
| 5,904,845 A | * | 5/1999 | Girondi | 210/306 |
| 5,985,139 A | * | 11/1999 | Zoeller | 210/136 |
| 6,234,200 B1 | * | 5/2001 | Hall | 137/590 |
| 6,358,422 B1 | * | 3/2002 | Smith et al. | 210/691 |
| 6,514,404 B1 | * | 2/2003 | Bauer | 210/86 |

FOREIGN PATENT DOCUMENTS

| | | | |
|---|---|---|---|
| EP | 754483 A1 | 1/1995 | |
| EP | 715873 A2 | 6/1995 | |
| EP | 715873 A2 | 6/1996 | |
| EP | 754483 | * 1/1997 | |
| EP | 806564 A1 | 12/1997 | |
| FR | 2548920 | 1/1985 | |
| JP | 10043513 A | * 2/1998 | B01D/27/06 |

* cited by examiner

*Primary Examiner*—Terry K. Cecil
(74) *Attorney, Agent, or Firm*—Crowell & Moring LLP

(57) ABSTRACT

A filter with a cylindrical filter cartridge in which the filter cartridge has a recess 23, through which functional parts, such as a water level sensor 25 and a water discharge tube 24, can be inserted. This filter may be used, for example, as a fuel filter in which the separated water can be removed from the housing through the functional parts. The functional parts are arranged on a support member 26 and extended through the recess 23, 23a in the filter cartridge 19, and can be accommodated in a space saving manner on the housing cover 12. As a result, the fuel filter can be accommodated particularly in cramped installation spaces in the engine compartment of an internal combustion engine.

5 Claims, 1 Drawing Sheet

FILTER WITH AN ANNULARLY CONSTRUCTED FILTER MEDIUM

BACKGROUND OF THE INVENTION

The invention relates to a filter with an annular-shaped filter medium between end plates, with said filter medium being in the form of a filter cartridge, and mounted in a housing structure with a further functional part. In another aspect, the invention relates to a filter cartridge which is suitable for mounting in the filter of the invention.

Such filters are known. They are used, in particular, for filtering liquids, such as for filtering fuel for a fuel-burning engine. A filter of this type is disclosed, for example, in Biere et al., U.S. Pat. No. 5,547,565 (= EP 715,873). At the bottom of the housing, this filter has a discharge valve for water, which is contained in the fuel and which gradually separates and accumulates in the housing. A water sensor, which is likewise arranged at the bottom of the housing, determines the maximum allowable water level in the housing and signals the need to discharge the water from the fuel filter.

However, arranging the discharge valve and water sensor at the bottom of the housing of the fuel filter presupposes that there is sufficient space available there to install these elements in the engine compartment of the fuel-burning engine. The space conditions in motor vehicles are often greatly limited by other parts, after all. The chances of a practical integration of the fuel filter into the fuel-burning engine are therefore restricted by the described geometry of the water discharge and of the sensor. In particular, there must be enough space under the discharge valve in order to provide a collecting vessel for the water that drains off.

SUMMARY OF THE INVENTION

It is therefore the object of the invention to provide a filter that exhibits great freedom in design with respect to other function components placed in the filter.

Another object of the invention is to provide a filter construction with an additional element, such as a water discharge and/or sensor, which is particularly suited to be installed in a limited space.

These and other objects are achieved in accordance with the present invention by providing a filter comprising a filter housing with an inlet and an outlet for a fluid to be filtered, a filter cartridge arranged in said housing so that fluid from said inlet must flow through said filter cartridge to reach said outlet, and an additional functional part; said filter cartridge comprising an annularly constructed filter medium arranged between two axial end plates, and wherein said filter medium of said filter cartridge is provided with a lateral recess for accommodating said additional functional part of said filter.

In accordance with a further aspect of the invention, the objects are also achieved by providing a filter cartridge comprising an annularly constructed filter medium arranged between two axial end plates, wherein the filter medium is provided with a lateral recess for accommodating a functional part of a filter in which the filter cartridge is to be installed.

The filter according to the invention is provided in a known manner with a housing structure, which may, for example, comprise a cup-shaped housing with an inlet and an outlet for the fluid to be filtered. A filter cartridge comprising a ring-shaped or annular filter medium, is installed in this housing. The filter medium may, for example, comprise a non-woven web of filter material or a filter fleece that can be wound around a supporting structure. Another advantageous possibility is to connect the end edges of a sheet of zig-zag folded or pleated filter material into an annular shape, such that a filter cartridge is formed by the annular sheet together with end plates. The cylindrical filter cartridge will generally exhibit a circular cross-section, but other cross-sectional configurations, such as for example an elliptical cross-section, are likewise possible within the scope of the invention.

A further functional part is provided in the filter, with said component assuming a particular function in the filter. This is attached to the housing structure, and in accordance with the invention, installed in a recess in the filter medium, with the recess being provided in the filter cartridge for this purpose. As a result, the other functional component can be flexibly arranged in the housing structure. In this manner, the installation conditions of the filter at the place of installation can be better accommodated.

If the filter medium is formed by a filter web joined in an annular shape, the recess can be advantageously formed by a folded pocket with an enlarged distance between folds. The enlarged distance between folds provides a recess extending parallel to the axis of the filter, with the recess not creating any additional need for sealing in the filter medium since the filter medium is still closed in an annular ring. The filter sheet can be made of filter paper or of a non-woven fleece. Multi-layer filter media, which may also have supporting layers or preliminary layers, are also conceivable within the scope of the invention.

In one specific embodiment of the invention, at least one of the end plates also is provided with a recess, which corresponds to or registers with the recess in the filter medium. As a result, the other functional part can be inserted into the recess even from the front end of the filter cartridge. The recess in the end plate can be formed, for example, by a hole or a notch in the end plate.

Particular embodiments of the invention provide that the additional functional part is a probe of a water level sensor and/or a suction tube intake for a water discharge. The water discharge is particularly suitable for removing the water separated from the fuel of a fuel filter. In this connection, the water level sensor can determine the maximum allowable level in the housing structure of the filter. Since the water separated from the fuel collects in the lower part of the housing, appropriate demands are to be made on the position of the device to accommodate the water level sensor and the liquid discharge. As a result, the geometric clearance for installing these functional parts is limited in any event. As a result, the recess in the filter cartridge has a particularly advantageous effect for these parts since the problem of the limited ways of fastening is compensated.

A fuel filter for the filter cartridge with the recess advantageously comprises a housing cup and a housing cover, with the other functional part being fastened to the cover. In a hanging arrangement of the fuel filter with housing cup downwards, the fastening in the cover is possible only if the cartridge has a recess. Otherwise, it may not be possible to extend a water level sensor or a suction tube intake along the cartridge since no space is provided for this in the housing cup. However, the arrangement of the mentioned functional parts in the cover is not just to be given preference on account of the more favorable space conditions for installation, but also because all the complex receptacles for inlet, outlet, and the functional parts can be integrated into the cover. The housing cup consequently becomes a geometrically simple and easy-to-manufacture part, as a result of which the solution is more economical.

The scope of the invention also includes a filter cartridge which includes the features described above and which is intended to be installed, as described above, in a filter according to the invention.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures in which.

DETAILED DESCRIPTION OF PREFERRED EMBODIMENTS

Figure 1:
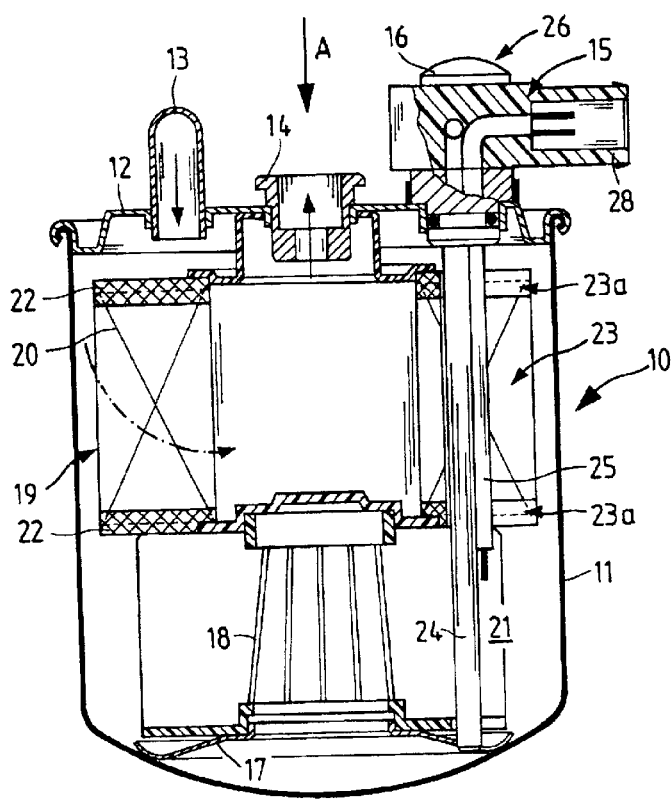
FIG. 1 shows a central section through a fuel filter.

The fuel filter in accordance with FIG. 1 exhibits a housing structure 10 with a housing cup 11 and a housing cover 12. In housing cover 12 there are an inlet 13 and an outlet 14 for the fuel as well as a water level sensor 15 and a liquid discharge 16 for the water to be discharged from the housing.

A filter cartridge 19 is installed in the housing cup 11, with the help of a plate spring 17 and a spacer 18, in such a way that the filter cartridge separates the inlet 13 in an sealed manner from the outlet 14. As a result, the fuel must flow through a filter medium 20, as indicated by the arrow. As a result of the spacer, a collecting chamber 21 for separated water is formed in the lower portion of the housing cup.

The filter cartridge 19 is comprised of the annular-shaped filter medium 20, which is formed by a filter paper folded in zigzag shape, and of end plates 22, in which the axial end faces of the filter medium are embedded. Also illustrated is a recess 23 in the filter medium, as well as recesses 23a in the end plates 22, through which a suction tube intake 24 of the liquid discharge 16 and a probe 25 of the water level sensor 15 are guided. These extend from their mounting locations on the housing cover 12 to collecting chamber 21 for the separated water, with the collecting space arranged underneath the filter cartridge as a result of the fuel filter being installed in a position with the housing cup 11 pointing downwards. The water level sensor 15 and liquid discharge 16 are integrated in an assembly head 26.

Figure 2:
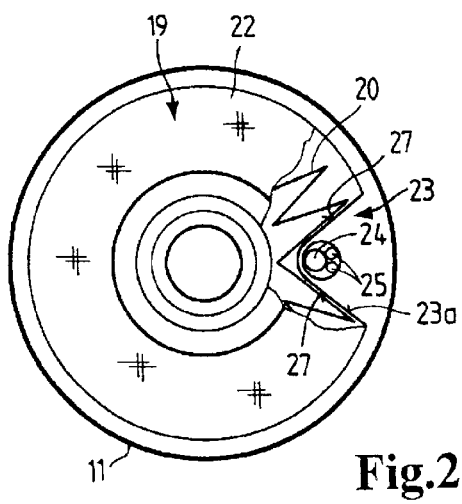
FIG. 2 shows a view of a fuel filter in accordance with FIG. 1 without a cover.

FIG. 2 affords a view of the filter cartridge 19, with the upper end plate 22 shown partly broken away. Under the end plate, the folded filter medium 20 is visible, with the recess 23 being formed by a folded pocket 27, which has a greater distance between folds than the recesses between the other pleats of the folded filter medium. The recess 23 of the filter medium registers or corresponds with the recesses or notches 23a in the end plates 22. In FIG. 2, the recess or notch 23a in the lower end plate can be seen through the cut away portion of upper end plate 22. Furthermore, the section through the probe 25 and the suction tube intake 24 can be seen in the recess 23. The housing cup 11 is indicated as the site of installation.

Figure 3:
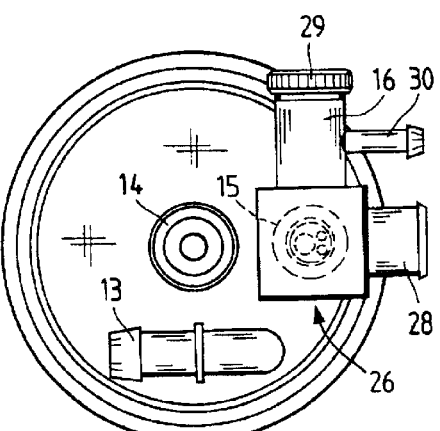
FIG. 3 shows a plan view of a mounted fuel filter according to FIG. 1 viewed in the direction of arrow A.

FIG. 3 is a view of the fuel filter, in which the inlet 13 is shown in a shifted position. The outlet 14 and the assembly head 26 can also be seen. Assembly head 26 is comprised of the water level sensor 15, which has a plug connection 28 for signal lines that are not shown, and the liquid discharge 16, which has a manually actuated valve screw 29 and a hose connecting nozzle 30.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A filter comprising a filter housing with an inlet and an outlet for a fluid to be filtered, a filter cartridge arranged in said housing so that fluid from said inlet must flow through said filter cartridge to reach said outlet, and an additional functional part arranged in said housing with said filter cartridge; said filter cartridge comprising an annularly constructed filter medium arranged between two axial end plates, wherein said filter medium of said filter cartridge is provided with a lateral recess for accommodating said additional functional part of said filter, and said additional functional part comprises a probe of a water level sensor and a suction tube of a liquid discharge, wherein the filter medium is comprised of a sheet of filter material folded in zig-zag fashion to form a pleated structure, wherein said lateral recess is a folded pocket formed by an enlarged distance between adjacent folds, and wherein said lateral recess in the filter medium of the filter cartridge extends axially at least to one of the end plates of the filter cartridge and said one end plate is provided with a notch which is aligned with said lateral recess in the filter medium.

2. A filter according to claim 1, wherein said housing comprises a housing cup and a housing cover, and wherein said functional part is mounted on said cover and extends into the lateral recess in the filter medium of the filter cartridge when the filter cartridge is installed in said housing.

3. A filter according to claim 1, wherein said filter is a fuel filter for an internal combustion engine.

4. A filter cartridge comprising an annularly constructed filter medium arranged between two axial end plates, wherein the filter medium is provided with a lateral recess for accommodating a functional part arranged in a filter housing in which the filter cartridge is to be installed, said functional part comprising a probe of a water level sensor and a suction tube of a liquid discharge, wherein said filter medium is a pleated filter sheet, and said lateral recess comprises a folded pocket formed by a spacing between two adjacent pleats, wherein the two axial end plates are provided with notches aligned with the lateral recess in the filter medium so that said functional part can be inserted in an axial direction through one of the end plates into said lateral recess in the filter medium, and wherein the lateral recess is arranged outside of the annular filter medium and is larger than other similar spacings that are outside of the annular filter medium and between other two adjacent pleats.

5. A filter cartridge according to claim 4, wherein the lateral recess in the filter medium extends axially from one of the end plates to the other end plate.

* * * * *